(12) United States Patent  
Dlugoss et al.

(10) Patent No.: US 9,174,640 B2
(45) Date of Patent: Nov. 3, 2015

(54) SYSTEM AND METHOD FOR CONTROLLING A HYBRID POWERTRAIN

(71) Applicant: GM Global Technology Operations LLC, Detroit, MI (US)

(72) Inventors: Randall B. Dlugoss, Royak Oak, MI (US); Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 24 days.

(21) Appl. No.: 14/093,793

(22) Filed: Dec. 2, 2013

(65) Prior Publication Data

US 2015/0151738 A1 Jun. 4, 2015

(51) Int. Cl.
*B60W 20/00* (2006.01)
*B60K 6/50* (2007.10)

(52) U.S. Cl.
CPC ............... *B60W 20/40* (2013.01); *B60K 6/50* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 5,413,012 A | 5/1995 | Davis | |
| 5,425,284 A | 6/1995 | Davis | |
| 5,508,916 A | 4/1996 | Markyvech et al. | |
| 5,974,354 A | 10/1999 | Janecke et al. | |
| 8,079,936 B2 | 12/2011 | MacFarlane et al. | |
| 2008/0305925 A1 | 12/2008 | Soliman et al. | |
| 2009/0265052 A1* | 10/2009 | Muta | 701/22 |
| 2010/0324762 A1 | 12/2010 | Imaseki et al. | |
| 2011/0053734 A1 | 3/2011 | Kaltenbach et al. | |
| 2011/0118925 A1* | 5/2011 | Sasaki | 701/22 |
| 2012/0306457 A1 | 12/2012 | Haggerty et al. | |
| 2012/0309587 A1* | 12/2012 | Nozaki | 477/5 |
| 2013/0079967 A1* | 3/2013 | Terakawa et al. | 701/22 |
| 2013/0184922 A1* | 7/2013 | Kabe | 701/22 |
| 2013/0282215 A1* | 10/2013 | Makabe et al. | 701/22 |
| 2013/0296108 A1 | 11/2013 | Ortmann et al. | |
| 2013/0297127 A1* | 11/2013 | Takamura et al. | 701/22 |
| 2013/0297136 A1* | 11/2013 | Yamanaka et al. | 701/22 |
| 2013/0331227 A1* | 12/2013 | Kato | 477/3 |
| 2014/0024495 A1* | 1/2014 | Kim et al. | 477/167 |
| 2014/0088805 A1 | 3/2014 | Tulpule et al. | |
| 2014/0148986 A1* | 5/2014 | Yoshikawa et al. | 701/22 |
| 2014/0195082 A1* | 7/2014 | Takamura et al. | 701/22 |
| 2014/0358345 A1* | 12/2014 | Kaihara et al. | 701/22 |

FOREIGN PATENT DOCUMENTS

JP 2008162315 A 7/2008

OTHER PUBLICATIONS

U.S. Appl. No. 13/925,813, filed Jun. 24, 2013, Min-Joong Kim et al.

\* cited by examiner

*Primary Examiner* — Thomas Tarcza
*Assistant Examiner* — Richard Goldman

(57) ABSTRACT

A system for controlling a hybrid powertrain having an electric motor, an engine and a transmission includes an engine control module that receives a torque request, and when the hybrid powertrain is being powered by the electric motor, determines whether to switch from the electric motor to the engine based on the torque request. A transmission control module, in response to a determination to switch from the electric motor to the engine, determines a target engine speed based on the torque request, and switches the hybrid powertrain from the electric motor to the engine based on a comparison between a current engine speed and the target engine speed.

16 Claims, 4 Drawing Sheets

SYSTEM AND METHOD FOR CONTROLLING A HYBRID POWERTRAIN

FIELD

The present disclosure relates generally to powertrains, and more particularly to a system and method for controlling a hybrid powertrain.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A hybrid powertrain may include an engine and an electric motor. In some situations, the hybrid powertrain may be powered solely from the electric motor (for example, at low vehicle speeds). In other situations, the hybrid powertrain may be switched from the electric motor to the engine (for example, at higher vehicle speeds). Some hybrid powertrains may experience a torque disturbance when the hybrid powertrain is switched from the electric motor to the engine. The torque disturbance may affect the drivability of the vehicle.

SUMMARY

A system for controlling a hybrid powertrain is presented. The hybrid powertrain includes an electric motor, an engine and a transmission. The system comprises an engine control module and a transmission control module. The engine control module (i) receives a torque request, and (ii) when the hybrid powertrain is being powered by the electric motor, determines whether to switch from the electric motor to the engine based on the torque request. The transmission control module, in response to a determination to switch from the electric motor to the engine, determines a target engine speed based on the torque request, and switches the hybrid powertrain from the electric motor to the engine based on a comparison between a current engine speed and the target engine speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A hybrid powertrain may include an electric motor, an engine and a transmission. The engine and the transmission may be connected via a torque converter. The torque converter may include a clutch. When the clutch is engaged, torque generated by the engine may be transferred to the transmission. When the clutch is disengaged, torque generated by the engine may not get transferred to the transmission.

In some situations, the hybrid powertrain may be powered solely from the electric motor (for example, at low vehicle speeds). When the hybrid powertrain is being powered solely from the electric motor, the engine is shut off so that the engine is not providing torque to the transmission. The transmission is disengaged via internal ratio changing clutches. The hybrid powertrain may be switched from the electric motor to the engine by engaging the clutch. The hybrid powertrain may experience a torque disturbance when the engine is started, initiates spinning, or generates torque. The torque disturbance may be significant if there is a substantial difference between the engine speed and the transmission input speed. The difference between the engine speed and the transmission speed may be referred to as synchronous speed. The rotational speed of the engine equals the output speed of the transmission multiplied by the transmission gear ratio.

The transmission control module of the present disclosure determines a target engine speed. The target engine speed may be determined based on a current transmission output speed and a current transmission gear ratio. The target engine speed may be determined further based on a torque converter speed ratio so that slip normally between the input of the torque converter and the output of the torque converter may be accounted for. The transmission clutches may be engaged as the engine speed approaches the target engine speed. Advantageously, the torque disturbance may be mitigated by engaging the transmission clutches as the current engine speed approaches the target engine speed.

A method for mathematically controlling the target engine speed based on physical principals of mass inertia changes may be used to characterize the engine speed changes providing a predictable increase in engine speed and a predictable change or increase of engine torque. In this manner, the predictable engine torque allows for a smooth and controllable transmission clutch application. Further, the predictable engine torque allows for a controllable ratio change of the transmission so torque may be transferred to the drive wheels and limit torque disturbance.

Figure 1:
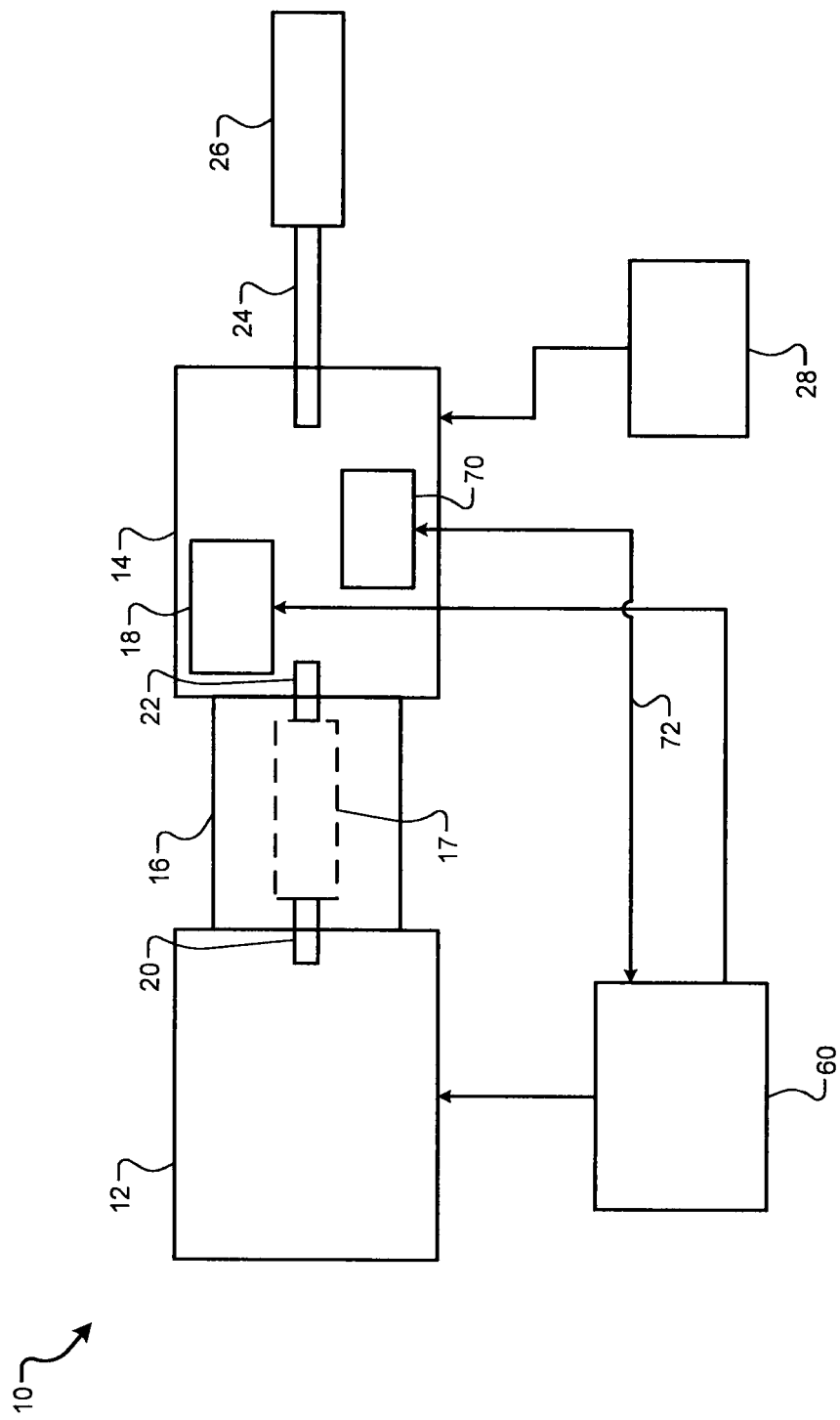
FIG. 1 is a functional block diagram of an example hybrid powertrain system according to the principles of the present disclosure.

Referring now to FIG. 1, a functional block diagram of an example hybrid powertrain 10 is presented. An internal combustion engine 12 drives a transmission 14 via a torque converter 16. The engine 12 may include, for example, a spark-ignition engine, a compression-ignition engine, or another suitable type of engine. A vehicle may also include an electric motor 18.

The engine 12 outputs torque to the torque converter 16 via an engine output shaft 20, such as a crankshaft. The torque converter 16 may include a clutch 17. When the clutch 17 is engaged, the torque converter 16 supplies torque to the transmission 14 via a transmission input shaft 22. When the clutch 17 is disengaged, torque is not transferred from the engine 12 to the transmission 14. The electric motor 18 may also output torque to the transmission input shaft 22 to supplement or replace engine torque output. The electric motor 18 may convert mechanical energy into electrical energy under some circumstances, for example, to recharge one or more batteries and/or to supply power for electronic components of the vehicle.

The transmission 14 includes one or more gearsets (not shown) for transferring torque between the transmission input shaft 22 and a transmission output shaft 24. A gear ratio may refer to the ratio between the rotational speed of the transmission input shaft 22 and the rotational speed of the transmission output shaft 24. The transmission output shaft 24 drives a driveline 26, and the driveline 26 transfers torque to wheels (not shown) of the vehicle. A range selector 28 enables a user to select a mode of operation of the transmission 14. The mode may include, for example, a park mode, a reverse mode, a neutral mode, or one or more forward drive modes.

An engine control module (ECM) 60 controls operation of the engine 12. The ECM 60 or another control module (not shown) may control operation of the electric motor 18 in various implementations. A transmission control module (TCM) 70 controls operation of the transmission 14. While the TCM 70 is shown as being implemented within the transmission 14, the TCM 70 may be implemented externally to the transmission 14 in various implementations. The ECM 60 and the TCM 70 may share data via a connection 72.

Figure 2:
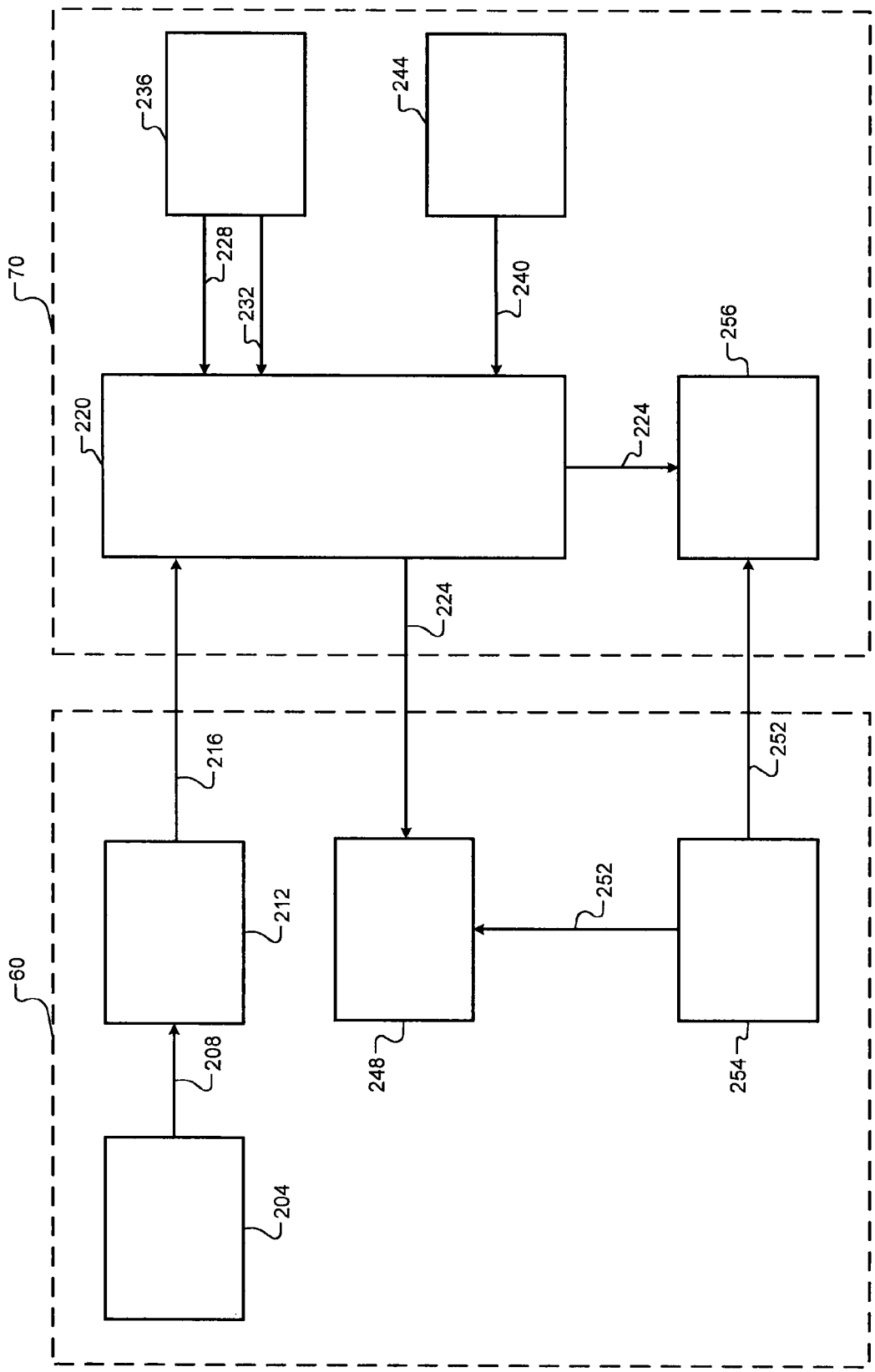
FIG. 2 is a functional block diagram of an example engine control module and an example transmission control module interface with the engine control module according to the principles of the present disclosure.

FIG. 2 depicts an example ECM 60 and an example TCM 70. A torque request module 204 may determine a torque request 208 based on one or more driver inputs, such as an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 60 and/or torque requests received from other modules of the vehicle, such as the TCM 70.

A hybrid control module 212 may determine how to satisfy the torque request 208. When the electric motor 18 is powering the hybrid powertrain 10 and the clutch 17 is disengaged, the hybrid control module 212 may determine whether to switch the hybrid powertrain 10 from the electric motor 18 to the engine 12. The hybrid control module 212 may compare the torque request 208 with a predetermined torque request threshold. If the torque request 208 exceeds the predetermined torque request threshold, then the hybrid control module 212 may determine that the hybrid powertrain 10 is to be powered by the engine 12 instead of or in addition to the electric motor 18. The hybrid control module 212 may send a signal 216 to the TCM 70 to switch to the engine 12. In some implementations, the engine 12 may be started from a non-spinning state when the TCM 70 switches to the engine 12. The predetermined torque request threshold may be a maximum torque output of the electric motor 18.

A target engine speed determination module 220 may determine a target engine speed 224 based on the torque request 208, in response to receiving the signal 216 to switch the powertrain 10 from the electric motor 18 to the engine 12. The target engine speed 224 may be determined based on a current transmission output speed 228 and a current transmission gear ratio 232. The target engine speed 224 may be determined by calculating a product of the current transmission output speed 228 and the current transmission gear ratio 232.

A transmission characteristics determination module 236 may determine the current transmission output speed 228 via a sensor that measures a speed of the transmission output shaft 24. The current transmission gear ratio 240 may be determined by calculating a ratio between the transmission input shaft 22 and the transmission output shaft 24.

The target engine speed determination module 220 may determine the target engine speed 224 further based on a torque converter speed ratio 240. The target engine speed 224 may be determined by adding the torque converter speed ratio 240 to a product of the current transmission output speed 228 and the current transmission gear ratio 232. A torque converter characteristics determination module 244 may determine the torque converter speed ratio 240 by calculating a ratio between the engine output shaft 20 and the transmission input shaft 22.

An engine speed control module 248 controls one or more engine actuators based on the target engine speed 224. For example, the engine speed control module 248 may control a throttle valve opening, spark timing, fuel injection and/or cylinder actuation in order to change the speed of the engine 12. The engine speed control module 248 may control the engine actuator(s) so that a current engine speed 252 equals the target engine speed 224. A current engine speed determination module 254 may determine the current engine speed 252 by measuring a speed of the engine output shaft 20.

A transmission clutch engagement module 256 may compare the current engine speed 252 with the target engine speed 224 and engage the clutch 17 based on the comparison. The clutch 17 may be engaged when the current engine speed 252 is equal to the target engine speed 224 or approximately equal to the target engine speed 224, for example within 5% of the target engine speed 224. It is understood that the modules described with respect to FIGS. 1 and 2 may be physically and/or logically connected in the manner described herein or any other suitable manner.

Figure 3:
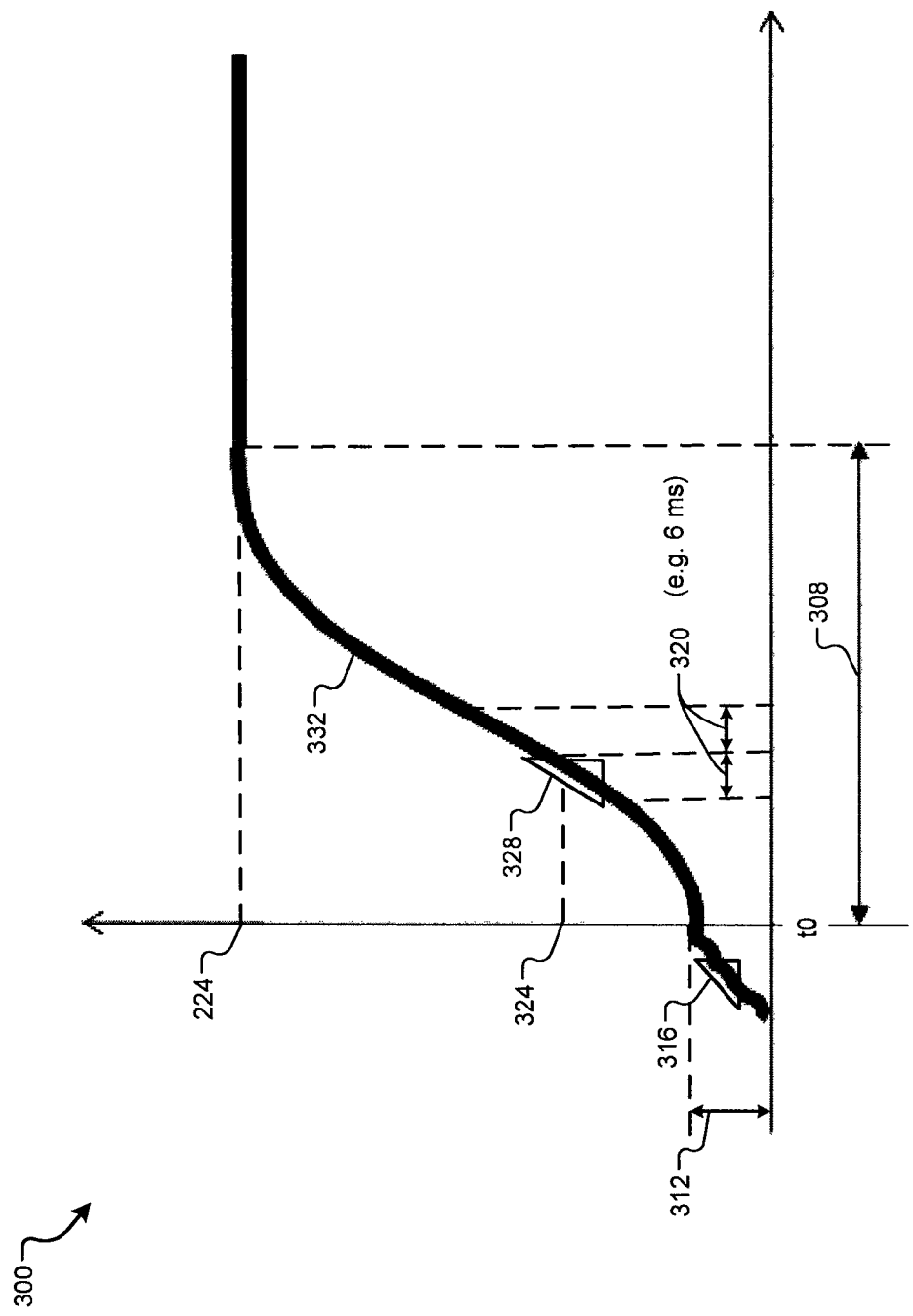
FIG. 3 is an example plot illustrating engine speed versus time according to the principles of the present disclosure.

FIG. 3 depicts an example plot 300 that illustrates current engine speed versus time. To mitigate the torque disturbance when switching to the engine 12, before the clutch 17 is engaged, the engine speed may be increased to the target engine speed 224 in the manner illustrated in FIG. 3.

At t0, the hybrid control module 212 may determine that the hybrid powertrain 10 is to be powered from the engine 12 based on the torque request 208. The target speed determination module 220 determines a target engine speed 224 based on the torque request 208. The target speed determination module 220 determines a time duration 308 during which the engine 12 may achieve the target engine speed 224 before the clutch 17 is engaged. The time duration 308 may be determined based on a difference between an initial engine speed 312 and the target engine speed 224. The initial engine speed 312 may be the speed of the engine 12 when the hybrid control module 212 determines that the hybrid powertrain 10 is to be powered from the engine 12. The time duration 308 may be set to a predetermined amount of time, for example 0.5 seconds. An initial rate of change 316 in the engine speed may also be determined.

The target speed determination module 220 segregates the time duration 308 into a plurality of time intervals 320. The time intervals 320 may be of equal length or may have different lengths. The length of the time intervals 320 is determined based on the difference between the target engine speed 224 and the initial engine speed 312. The length of the time intervals 220 may be set to a predetermined length, for example six (6) milliseconds.

The target speed determination module 220 determines an intermediate target engine speed 324 for each time interval 320. The intermediate target engine speed 324 is determined at the beginning of each time interval 320, during each time interval 320 or at the end of each time interval 320. The intermediate target engine speed 324 may be calculated according to $$v(t)=v0+t*(\alpha 0+t*(C1+t*C2)), \text{ wherein}$$

v(t) is the intermediate target engine speed 324, t is a time at which the intermediate target engine speed 324 is calculated, for example the beginning of each time interval 320, v0 is an initial engine speed 312 before the time duration 308 begins, α0 is an initial rate of change 316 in the engine speed before the time duration 208 begins, $C1=-(3*v0+2*\alpha 0+2*\alpha 0*T)/T^2$, $C2=(2*v0+\alpha 0*T)/T^3$, and T is the time duration 308 during which the engine speed has to changed.

The target speed determination module 220 may determine an intermediate target rate of change 328 in the engine speed for each time interval 320. The intermediate target rate of change 328 may be determined at the beginning of each time interval 320, during each time interval 320 or at the end of each time interval 320. The intermediate target rate of change 328 may be calculated according to $$\alpha(t)=\alpha 0+t*(2*C1+t*3*C2), \text{ wherein}$$

α(t) is the intermediate target rate of change 328, t is a time at which the intermediate target rate of change 328 is calculated, for example the beginning of each time interval 320, α0 is an initial rate of change 316 in the engine speed before the time duration 308 begins, $C1=-(3*v0+2*\alpha 0*T)/T^2$, $C2=(2*v0+\alpha 0*T)/T^3$, and T is the time duration 308 during which the engine 12 may achieve the target engine speed 224. As can be seen, the curve 332 representing the engine speed resembles a portion of a sine wave.

The target speed determination module 220 sends a request to the ECM 60. The request may include the intermediate target engine speed 324 and the intermediate target rate of change 328. The request may indicate a request type. Example request types are transient and stability. In a transient request, the ECM 60 may attempt to achieve the intermediate target engine speed 324 as fast as possible which may result in an overshoot. In a stability request, the ECM 60 may gradually achieve the intermediate target engine speed 324 to avoid overshooting.

The request may include a validity bit that can be set to '1' by the target speed determination module 220 to indicate that the request is a valid request. The request may include a reason, for example 'switching from the electric motor powering mode to the engine powering mode'. The request may also include information on how to achieve the intermediate target engine speed 324. For example, the request may indicate whether to use the throttle valve, spark timing, fuel injection and/or cylinder actuation to achieve the intermediate target engine speed 324.

The engine speed control module 248 may receive the request from the TCM 70. The engine speed control module 248 may verify the validity of the request, for example by ensuring that the validity bit is set to '1'. The engine speed control module 248 may send control signals to one or more engine actuators to change the engine speed to achieve the requested intermediate target engine speed 324. When the engine speed is equal to the target engine speed 224, the clutch engagement module 256 engages the clutch 17. Upon clutch engagement, the engine 12 provides power to the transmission 14 and, consequently, to the hybrid powertrain 10.

Advantageously, by engaging the clutch 17 after the engine 12 acquires the target engine speed 224, the torque disturbance may be mitigated.

Figure 4:
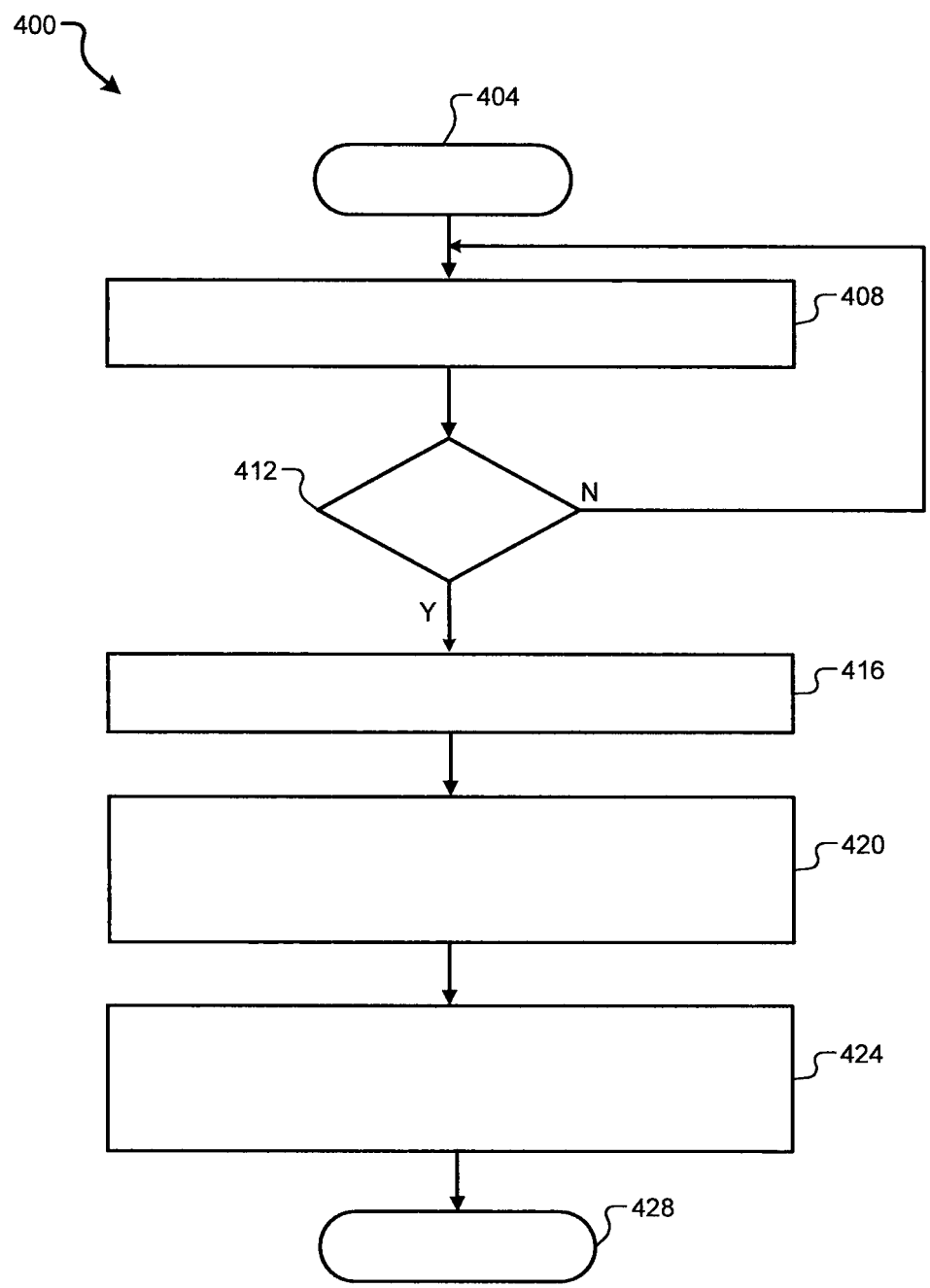
FIG. 4 is a flow diagram illustrating an example method for controlling a hybrid powertrain system according to the principles of the present disclosure.

FIG. 4 depicts a flow diagram that illustrates a method 400. The method 400 starts at 404. At 408, the method 400 receives a torque request.

At 412, the method 400 determines, when the hybrid powertrain 10 is being powered by the electric motor 18, whether to switch the hybrid powertrain 10 from the electric motor 18 to the engine 12 based on the torque request. The method 400 may determine whether to switch the hybrid powertrain 10 from the electric motor 18 to the engine 12 in any of the ways described above.

At 416, the method 400, in response to a determination to switch from the electric motor 18 to the engine 12, determines a target engine speed based on the torque request. The method 400 may determine the target engine speed in any of the ways described above.

At 420, the method 400 switches the hybrid powertrain 10 from the electric motor 18 to the engine 12 based on a comparison between a current engine speed and the target engine speed. The method may switch the hybrid powertrain 10 from the electric motor 18 to the engine 12 in any of the ways described above.

At 424, the method 400 engages the transmission clutches base on the comparison between the current engine speed and the target engine speed. For example, the method 400 calculates a total torque as a function of the inertia torque of the engine and a transmission spinning system and as a function of engine gas or power torque. The method 400 then determines a transmission clutch engagement pressure and a ratio selection. The method 400 then schedules the transmission clutch engagement pressure. The method 400 ends at 428.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system for controlling a hybrid powertrain having an electric motor, an engine and a transmission, the system comprising:
   an engine control module that (i) receives a torque request, and (ii) when the hybrid powertrain is being powered by the electric motor, determines whether to switch from the electric motor to the engine based on the torque request; and
   a transmission control module that, in response to a determination to switch from the electric motor to the engine,
   determines a target engine speed based on the torque request,
   switches the hybrid powertrain from the electric motor to the engine based on a comparison between a current engine speed and the target engine speed,
   determines a time duration during which the engine speed is to be changed,
   segregates the time duration into a plurality of time intervals, and
   separately determines respective intermediate target engine speeds to be achieved during each time interval,
   wherein the engine control module (i) receives each of the intermediate target speeds and (ii) sequentially increases the current engine speed to each of the intermediate target speeds during respective ones of the plurality of time intervals.

2. The system of claim 1, wherein the transmission control module determines the target engine speed further based on a transmission output speed and a transmission gear ratio.

3. The system of claim 2, wherein the transmission control module determines the target engine speed by determining a product of the transmission output speed and the transmission gear ratio.

4. The system of claim 1, wherein the transmission control module further determines a target rate of change at which the engine speed is to be changed.

5. The system of claim 1, wherein the transmission control module determines the intermediate target speed for each time interval according to $$v(t)=v0+t*(\alpha 0+t*(C1+t*C2)), \text{ wherein}$$

v(t) is the intermediate target engine speed,
t is a time at which the intermediate target engine speed is calculated,
v0 is an initial engine speed before the time duration begins,
α0 is an initial rate of change in the engine speed before the time duration begins,
C1 is a constant calculated according to $C1=-(3*v0+2*\alpha 0*T)/T^2$,
C2 is a constant calculated according to $C2=(2*v0+\alpha 0*T)/T^3$, and
T is the time duration during which the engine speed has to be changed.

6. The system of claim 1, wherein the transmission control module further determines an intermediate target rate of change of the current engine speed for each time interval.

7. The system of claim 6, wherein the transmission control module determines the intermediate target rate of change according to $$\alpha(t)=\alpha 0+t*(2*C1+t*3*C2), \text{ wherein}$$

α(t) is the intermediate target rate of change,
t is a time at which the intermediate target rate of change is calculated,
α0 is an initial rate of change in the engine speed before the time duration begins,
C1 is a constant calculated according to $C1=-(3*v0+2*\alpha 0*T)/T^2$,
C2 is a constant calculated according to $C2=(2*v0+\alpha 0*T)/T^3$, and
T is the time duration during which the engine has to achieve the target speed.

8. The system of claim 1, wherein the time duration is about 0.5 seconds and each time interval is about 6 milliseconds.

9. A method for controlling a hybrid powertrain having an electric motor, an engine and a transmission, the method comprising:
   receiving a torque request;
   determining, when the hybrid powertrain is being powered by the electric motor, whether to switch from the electric motor to the engine based on the torque request;
   determining, in response to a determination to switch from the electric motor to the engine, a target engine speed based on the torque request;
   switching the hybrid powertrain from the electric motor to the engine based on a comparison between a current engine speed and the target engine speed;
   determining a time duration during which the engine speed is to be changed;
   segregating the time duration into a plurality of time intervals;
   separately determining respective intermediate target engine speeds to be achieved during each time interval; and
   sequentially increasing the current engine speed to each of the intermediate target speeds during respective ones of the plurality of time intervals.

10. The method of claim 9, wherein determining the target engine speed comprises determining the target engine speed further based on a transmission output speed and a transmission gear ratio.

11. The method of claim 10, wherein determining the target engine speed comprises determining a product of the transmission output speed and the transmission gear ratio.

12. The method of claim 9, further comprising determining a target rate of change at which the engine speed is to be changed.

13. The method of claim 9, wherein determining the intermediate target engine speed comprises determining the intermediate target speed for each time interval according to $$v(t)=v0+t*(\alpha 0+t*(C1+t*C2)), \text{ wherein}$$

v(t) is the intermediate target engine speed, t is a time at which the intermediate target engine speed is calculated, v0 is an initial engine speed before the time duration begins, α0 is an initial rate of change in the engine speed before the time duration begins, C1 is a constant calculated according to $C1=-(3*v0+2*α0*T)/T^2$, C2 is a constant calculated according to $C2=(2*v0+α0*T)/T^3$, and T is the time duration during which the engine speed has to be changed.

14. The method of claim 9, further comprising determining an intermediate target rate of change of the current engine speed for each time interval.

15. The method of claim 14, wherein determining the intermediate target rate of change comprises determining the intermediate target rate of change according to $$α(t)=α0+t*(2*C1+t*3*C2),$$ wherein α(t) is the intermediate target rate of change, t is a time at which the intermediate target rate of change is calculated, α0 is an initial rate of change in the engine speed before the time duration begins, C1 is a constant calculated according to $C1=-(3*v0+2*α0*T)/T^2$, C2 is a constant calculated according to $C2=(2*v0+α0*T)/T^3$, and T is the time duration during which the engine has to achieve the target speed.

16. The method of claim 9, wherein the time duration is about 0.5 seconds and each time interval is about 6 milliseconds.

* * * * *